Oct. 25, 1955  J. O. EAMES  2,721,641
PARKING METER MECHANISM
Filed June 30, 1949  7 Sheets-Sheet 1

Fig. 1.

INVENTOR.
JAMES O. EAMES
BY
Burgess, Ryan & Hicks
ATTORNEYS

Oct. 25, 1955    J. O. EAMES    2,721,641
PARKING METER MECHANISM
Filed June 30, 1949    7 Sheets-Sheet 2

INVENTOR.
JAMES O. EAMES
BY
Burgess, Ryan & Hicks
ATTORNEYS

Oct. 25, 1955

J. O. EAMES

2,721,641

PARKING METER MECHANISM

Filed June 30, 1949

INVENTOR.
JAMES O. EAMES

BY
Burgess, Ryan & Hicks

ATTORNEYS

Oct. 25, 1955

J. O. EAMES

2,721,641

PARKING METER MECHANISM

Filed June 30, 1949

INVENTOR.
JAMES O. EAMES
BY
Burgess, Ryan & Hicks
ATTORNEYS

Oct. 25, 1955

J. O. EAMES 2,721,641

PARKING METER MECHANISM

Filed June 30, 1949

*INVENTOR.*
JAMES O. EAMES
BY
Burgess, Ryan & Hicks
*ATTORNEYS*

Oct. 25, 1955                   J. O. EAMES                    2,721,641
                          PARKING METER MECHANISM
Filed June 30, 1949                                        7 Sheets-Sheet 7

INVENTOR.
JAMES O. EAMES
BY
Burgess, Ryan & Hicks
ATTORNEYS

United States Patent Office 2,721,641
Patented Oct. 25, 1955

2,721,641

PARKING METER MECHANISM

James O. Eames, Washington, Conn., assignor, by mesne assignments, to The Michaels Art Bronze Company Incorporated, Covington, Ky., a corporation of Kentucky Application June 30, 1949, Serial No. 102,189

23 Claims. (Cl. 194—72)

The present invention relates to vehicle parking meters.

In particular, the invention relates to parking meters of the type where a coin is deposited for the purchase of a specified period of parking. Such meters have, in general, been designated as either manual or automatic meters in accordance with the commonly understood and accepted meaning of such terms. Briefly, the manual type of meter is one that requires that a parker perform some act in addition to the deposit of a coin in order to place the meter in operation, whereas the automatic type of meter is one that requires only the deposit of a coin by the parker to place the meter in operation.

While the present invention has particular application to automatic meters, it will be understood that the invention is not limited to automatic meters and may be applied to manual or other types of meters if desired.

The meter that is illustrated and described herein embodies certain features corresponding to the parking meter illustrated and described in application, Serial No. 29,728, filed May 28, 1948 in the names of Roy S. Sanford and James O. Eames on Parking Meter Mechanisms wherein such features are described and claimed. Reference may also be made to said application for a more complete understanding of such features.

An object of the present invention is to provide a parking meter which is reliable and accurate in its operation but which is of a relatively simple and inexpensive construction. Another object of the invention is to provide a parking meter that is practically foolproof so that the meter can not be tampered with in a way that would affect its operation and parking time can only be obtained by the deposit of a coin in the meter.

Another object of the invention is to provide a parking meter which has an operating mechanism that can be readily adapted for use as a single coin meter or a multiple coin meter by extremely simple changes that do not affect the meter mechanism. In addition, the meter may be made progressive for coins of one denomination or for coins of several denominations as desired.

A further object of the invention is to provide a substantially weatherproof closure for the coin entrance slot and a simple, but efficient coin operated mechanism for operating the meter in association with the coin slot closing mechanism.

These objects and advantages of the invention and various other objects and advantages of the invention will be apparent and best understood by reference to the following description and the accompanying drawings in which:

Figure 1:
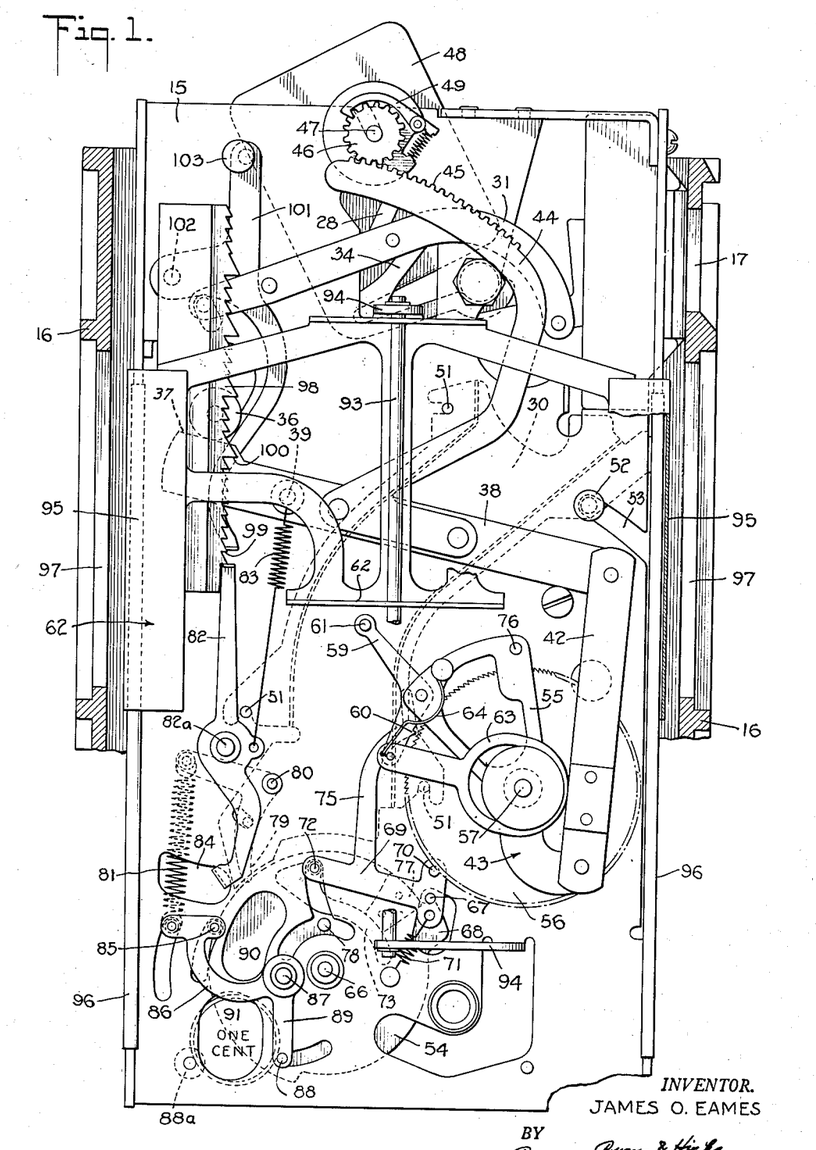
Fig. 1 is a side elevation in partial section taken from the front of the meter mechanism embodying the invention and includes a portion of the housing with certain parts being omitted and others being broken away for the purposes of clarity.

Referring to Fig. 1, it should be mentioned that the coin-receiving mechanism to be described later has been shown in a cocked position while the clutch mechanism is in an advanced position. This is merely so that these mechanisms may be shown more clearly and the manner in which these parts operate will be clearly understood from the following description.

Figure 4:
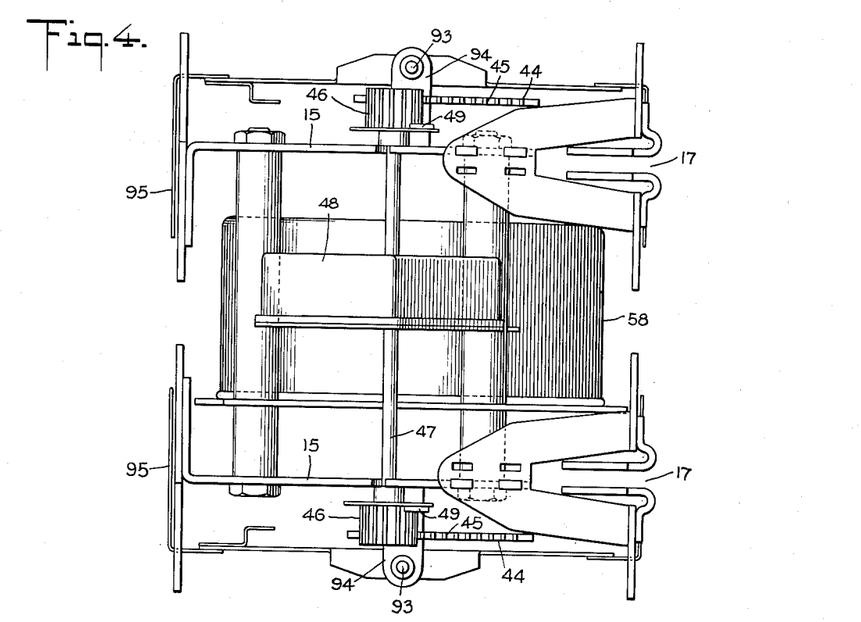
Fig. 4 is a top view showing a pair of the meter mechanisms illustrated in Fig. 1 arranged for operation in a plural parking meter.

In the following description, the illustrated meter mechanism and its operation will be described, insofar as possible, in the sequence in which the various operations of the mechanism take place when a coin is deposited in the meter for the purchase of a specified period of parking time. The corresponding parts of the mechanism that are shown in various views are identified throughout by similar reference characters. It will be understood that the illustrated meter mechanism may be used in either a single or plural type of parking meter, but for the purposes of brevity, the following description will be limited to a meter mechanism comprising a single unit. When the mechanism is used in a plural type of parking meter, two meter mechanisms are required, but they may be controlled by a single timer as illustrated in Fig. 4.

The various parts of the meter mechanism are supported on a chassis plate 15 with the various parts of the mechanism being mounted on both sides thereof. As shown in Fig. 1, the assembled mechanism is enclosed within a housing 16 of the usual weatherproof construction. The chassis plate 15 with the meter mechanism supported thereon may be removable from the housing as a unit for ease in repair or replacement. The housing 16 is supported in the usual manner by a post (not shown) which is located at an appropriate position in relation to a parking space.

The housing 16 has a coin slot 17 through which a coin may be inserted edgewise by the parker. The coin slot 17 is normally closed by a door 18 that is yieldably pressed against the coin slot from the inside of the housing. The door 18 is pivotally supported between the bifurcated arms of a door supporting strut 19. The pivotal mounting of the door 18 permits the door to fit flush against the housing to make a tight, weatherproof seal at the coin slot opening and it also permits the door 18 to assume a directly opposed position relative to a coin that is inserted in the coin slot. The door supporting strut 19 is pivoted at 20 on an actuator lever 21. The actuator lever 21 is in turn pivoted on the chassis plate 15 at 22 and is resiliently urged in a door closing direction by an actuator spring 23. Thus, upon insertion of a coin in the coin slot 17, the door 18 is forced inward by the pressure exerted against the coin. This moves the door supporting strut 19 and the actuator lever 21 first to the position shown in Fig. 5. During its movement to this position, the door supporting strut 19 is held against movement relative to the actuator lever 21 by a pin 24 which is carried by the door strut and engages with a notch 25a in a slot 25 in a door latch 26.

Figure 6:
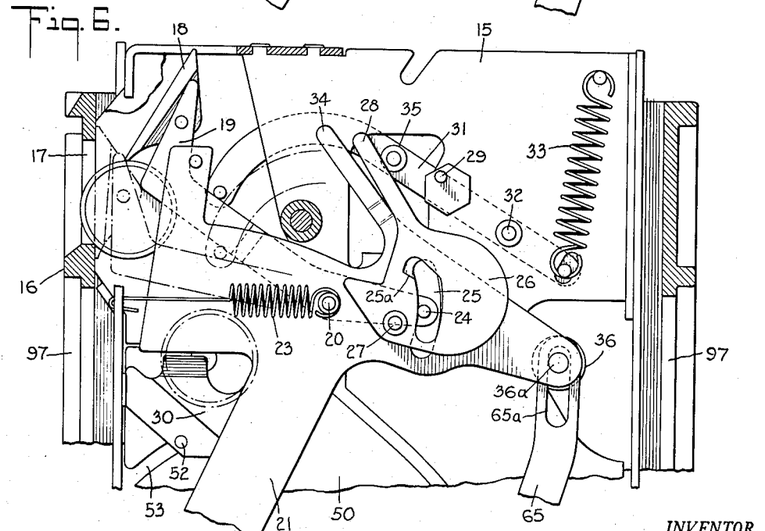
Fig. 6 is a view corresponding to Fig. 5 illustrating the position of the mechanism when a coin has been fully inserted in the meter.
Figure 7:
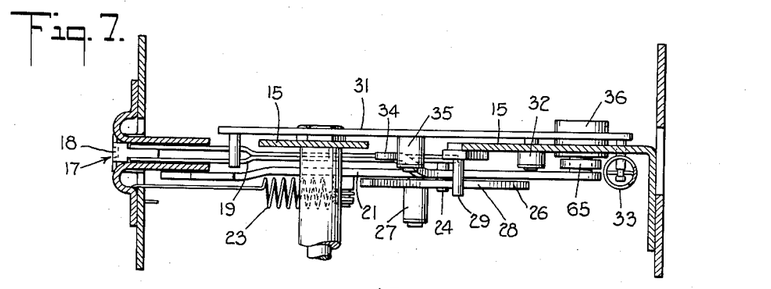
Fig. 7 is a section view taken along the line 7—7 of Fig. 5 but omitting the meter housing.

The door latch 26 is pivoted at 27 on the actuator lever 21 and has an arm 28 which engages with a latch releasing pin 29 that is adjustably mounted on the chassis plate 15. When the door supporting strut 19 and the actuator lever 21 are moved back by the coin to a point where the arm 28 of the door latch 26 strikes the adjustable latch release pin 29, the door latch 26 pivots about the point 27 and disengages the notch 25a in the slot 25 from the pin 24. This permits the door supporting strut then to swing upwardly to the position shown in Fig. 6 so that the coin being inserted may pass freely into a coin chute 30. When this occurs, the door 18 and the actuator lever 21 are released and the door 18 returns to its slot closing position as shown by the dot and dash lines in Fig. 6.

Figure 5:
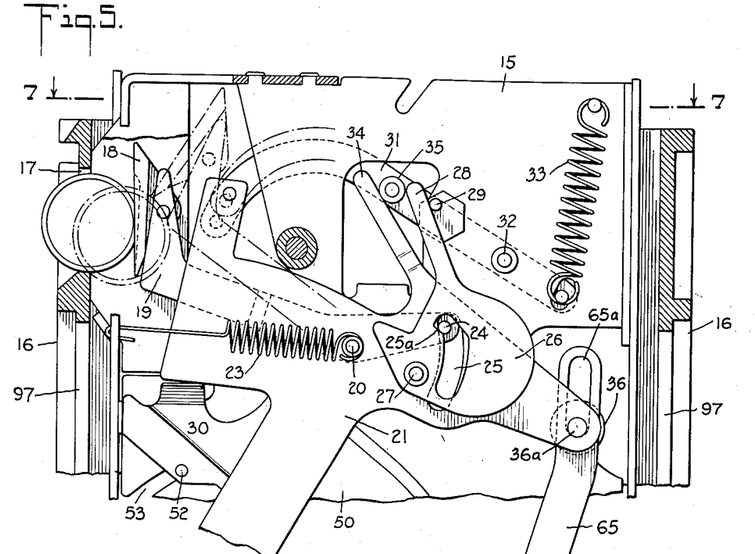
Fig. 5 is a side view in section of a portion of the meter mechanism shown in Fig. 3, but including the meter housing and illustrating the position of the mechanism when a coin has been partially inserted in the meter.

The door 18 is returned to its slot closing position by a door closer lever 31. The door closer lever 31 is pivoted at 32 on the chassis plate 15 and is urged into engagement with the door supporting strut 19 to hold the door in door closing position by a door closing spring 33 that is connected to the free end thereof. When a coin is pushed into the coin slot 17 forcing the actuator lever 21 inward, an arm 34 extending from the actuator lever 21 engages with a roller 35 on the door closer lever 31 and raises the door closing lever 31 from engagement with the door strut 19 as indicated in Fig. 5. Thus, the door closer lever 31 will not interfere with the door supporting strut 19 swinging upward when the door latch 26 is released. However, when the coin passes into the coin chute 30, the actuator spring 23 returns the actuator lever 21 to its initial position and carries the arm 34 out of engagement with the roller 35 permitting the door closer 31 to reengage with the door strut 19 and return the door 18 positively to its slot closing position under the force of the door closer spring 33. The door latch arm 28 is also released from the stop 29 and the pin 24 re-engages with the notch 25a in the slot 25 in the door latch 26 upon this movement of the actuator prior to insertion of the next coin.

The operation of the mechanism which has just been described after the release of a coin is positive and takes place very rapidy. If for any reason the coin does not pass freely down the coin chute 30, the return of the door 18 to slot closing position has a tendency to kick the coin down the coin chute 30 in addition to providing a positive weatherproof closure for the coin slot 17.

The actuator lever 21 carries a roller 36 mounted on a pin 36a located at one end of the actuator lever 21 and extending therefrom. The pin 36a projects through an aperture in the chassis plate 15 at one side thereof and the roller 36 engages with a cam surface 37 on one end of an intermediate lever 38. When a coin is pushed against the door 18 forcing the door supporting strut 19 and the actuator 21 rearward, as previously described, the roller 36 at the end of the actuator lever 21 moves downward in an arcuate path about the actuator pivot point 22. The downward movement of the roller 36 in this manner brings the roller 36 into engagement with the cam surface 37 on the intermediate lever 38 as shown best in Fig. 1. The intermediate lever 38 is secured to a rock shaft 39 that is rotatably supported on the chassis plate 15 so that the downward movement of the roller 36 forces the cam end of the intermediate lever down and raises the other end of the intermediate lever.

Figure 2:
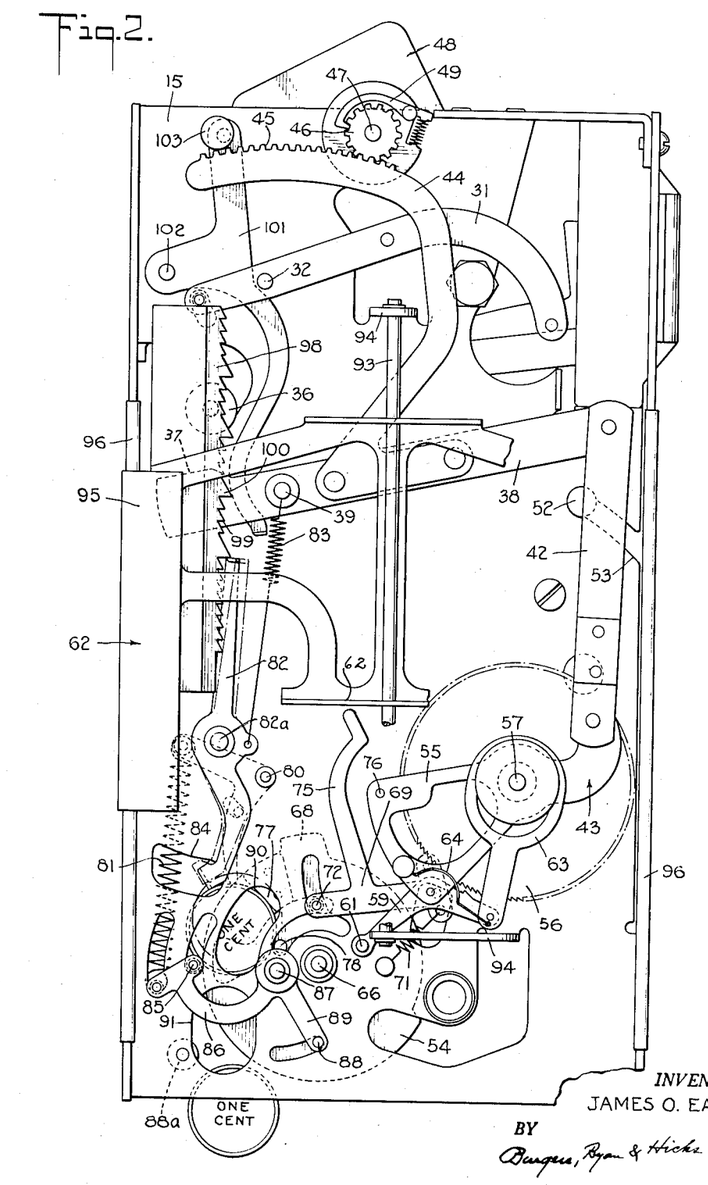
Fig. 2 is a side elevation of the meter mechanism shown in Fig. 1 with the meter housing being omitted and with certain parts of the meter mechanism being shown in a different operating position than in Fig. 1.
Figure 3:
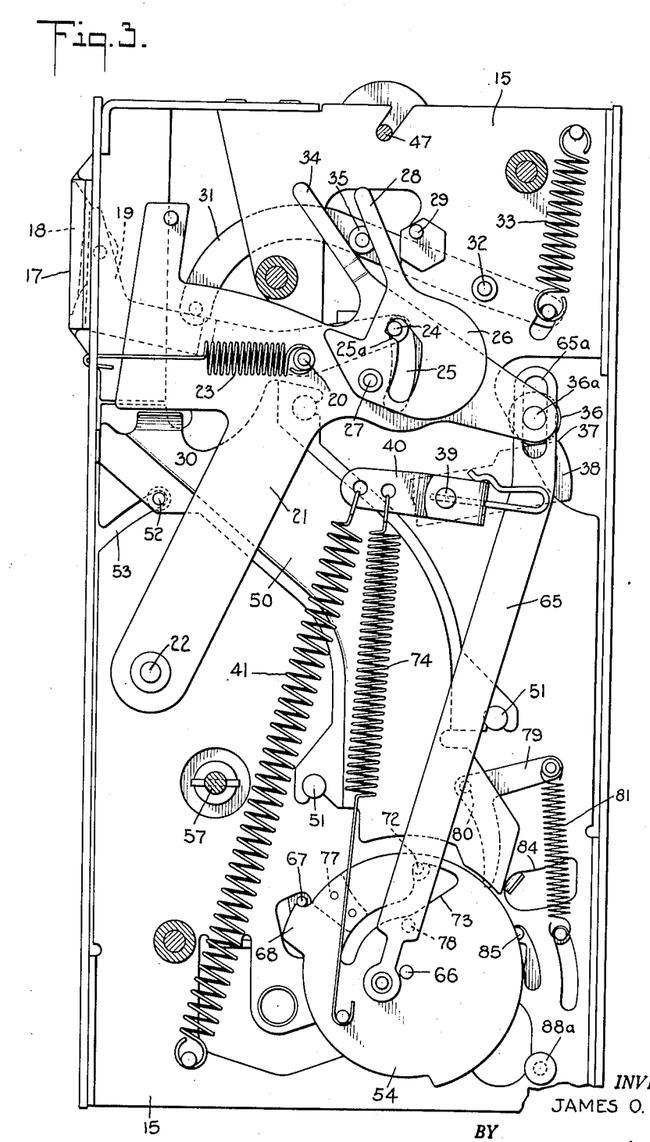
Fig. 3 is a side elevation in partial section taken from the rear of the meter mechanism illustrated in Fig. 1 with the meter housing being omitted.

The rock shaft 39 extends through the chassis plate 15 and has a power arm 40 (Fig. 3) secured to it on the other side of the chassis plate 15. The end of the power arm 40 is connected to one end of a power or energy-storing spring 41. The power spring 41 and the arm 40 are arranged so that the spring 41 will be stretched with potential energy being stored therein when the rock shaft 39 is rotated by the downward movement of the end of the intermediate lever 38 under the influence of the actuator 21. The other end of the intermediate lever 38 is connected by a link 42 to a clutch-shifting mechanism 43 which will be described in detail hereinafter. However, the downward movement of the end of the intermediate lever 38 by the actuator roller 36 moves the clutch mechanism 43 from an advanced position, such as illustrated in Fig. 1, to an overtravel or starting position, such as illustrated in Fig. 2.

The intermediate lever 38 also carries a time delay quadrant 44 which is moved in an arcurate path by movement of the intermediate lever 38. The quadrant 44 carries an arcuate rack 45 at one end thereof that engages with a spur gear 46. The spur gear 46 is rotatably mounted on a shaft 47 connected to a retarding device in the form of an impact escapement mechanism 48. The spur gear 46 is free to rotate on the shaft 47 under the influence of the arcuate rack 45 when the cam end of the intermediate lever 38 is forced down. However, the spur gear 46 is held against the rotation in the other direction relative to the shaft 47 by a spring urged pawl 49 and so that the return movement of the quadrant 44 is retarded by the impact escapement 48. Consequently, the rate at which the time delay quadrant 44, the intermediate lever 38 and the clutch 43 are able to be moved back to their initial position by the power spring 41 is retarded by the escapement 48 following the deposit of a coin in the meter. However, if for any reason the coin is withdrawn, the intermediate lever 38 and the shiftable clutch mechanism 43 are returned to their initial positions in due course. On the other hand if the coin is released, then further operations take place, as will now be described, that place the meter in operation.

Upon being released the coin passes into the coin chute 30 from the coin slot 17 and falls through the coin chute by gravity. The coin chute 30 is a downwardly extending passageway formed by the chassis plate 15 and a coin guide 50. The coin guide 50 is removably supported on the chassis plate 15 by headed pins 51 and by a guide pin 52 carried by the coin guide 50 which engages with a guide slot 53 in the chassis plate 15. This construction permits the coin guide 50 to be readily removed from the chassis plate 15 without disassembling or disturbing other portions of the meter mechanism in the event that the coin chute 30 should become jammed or clogged. When the coin guide 50 is in place, the coin chute 30 forms a passageway that has an entrance communicating with the coin slot 17 and an exit communicating with a rotatable coin receiving member 54.

The shiftable clutch mechanism 43 includes a yoke 55 that is rotatably mounted on the hub of a ratchet wheel 56. The ratchet wheel 56 is in turn secured to a shaft 57 that is connected to a conventional timer mechanism 58 as indicated in Fig. 4. One end of the yoke 55 is connected to the link 42 and the other end of the yoke carries a pivoted clutch operating lever 59. One arm of the clutch operating lever 59 carries a pawl 60 that is engageable with the ratchet teeth of the ratchet wheel 56 and its other arm carries a pin 61 that is engageable with a flag or indicator 62. The clutch operating lever 59 is retained in its operating position by a guide link 63 and a light spring 64. The guide link 63 is pivotably secured to the end of the pawl carrying arm of the lever 59 and is loosely connected to the shaft 57. The spring 64 is secured between the yoke 55 and the end of the guide link 63 and tends to hold the pawl 60 away from engagement with the ratchet wheel.

When a coin of any denomination is inserted in the coin slot 17, the shiftable clutch mechanism 43 is rotated about the periphery of the ratchet wheel 56 and is moved from its advanced or rest position to a starting or over-travel position through the agency of the link 42 which is connected to the intermediate lever 38 and the actuator 21. After the clutch mechanism 43 reaches its starting or over-travel position, it is returned towards its rest or advanced position by the power spring 41 until it reaches a position where the pin 61 engages with the indicator 62 at the purchased time position to which the indicator 62 has been moved. The movement of the clutch mechanism 43 from its overtravel position to an indicator engaging position is retarded by the retarding mechanism 48 in order to provide time for the movement of the indicator 62 to a purchased time position corresponding to the denomination of the coin that has been deposited in the meter.

When the clutch mechanism 43 reaches an indicator engaging position, the weight of the flag or indicator 62 resting on the pin 61 at the end of one arm of the clutch operating lever 59 urges the pawl 60 into engagement with the ratchet teeth on the ratchet wheel 56. The engagement of the pawl 60 with the ratchet teeth of the ratchet wheel 56 prevents slippage of the clutch relative to the ratchet wheel 56 thereafter and further movement of the clutch mechanism 43 towards its rest or advanced position under the influence of the power spring 41 is controlled by the timer mechanism 58. The continued movement of the clutch mechanism 43 then raises the flag or indicator 62 at a timed rate. As the indicator or flag 62 reaches its violation position and the clutch 43 reaches its terminal position, the side of the link 42 bears against the end of the guide link 63 and moves the guide link 63 outwardly so that the pawl 60 is disengaged from the ratchet teeth on the ratchet wheel 56. At this time, the opertaion of the timer mechanism 58 may be interrupted to be started again when a coin is deposited in the meter or the timer 58 may continue to operate, if desired.

When the clutch mechanism 43 reaches its terminal position, the indicator 62 will rest on the pin 61. However, in Fig. 1 these parts have been shown spaced apart a slight distance by the indicator having been raised above its violation position.

As the shiftable clutch mechanism 43 moves to its starting or overtravel position by the insertion of a coin in the meter, the rotatable coin receiving member 54, previously referred to, is simultaneously rotated by a cocking link 65 to its cocked or coin receiving position at the exit end of the coin chute 30. The coin receiving member 54 is secured to a shaft 66 that is rotatably supported on the chassis plate 15. One end of the cocking link 65 has a slot 65a through which the pin 36a which carries the actuator roller 36 extends. Thus, the slot 65a and the pin 36a form a lost motion connection between the cocking link 65 and the actuator lever 21. The other end of the cocking link 65 is connected at an off center position to the rotatable member 54. Thus, the downward movement of the end of actuator lever 21 carrying the pin 36a also moves the cocking link 65 downward and rotates the coin receiving member 54 to its coin receiving position. The lost motion connection between the cocking link 65 and the pin 36a permits the actuator lever 21 to return to its initial position without movement of the coin receiving member 54.

When the coin receiving member 54 reaches its coin receiving position, a trigger-controlled latch pin 67 engages with a latch 68 projecting from the periphery of the coin receiving member 54 and holds the coin receiving member in its coin receiving position. The latch pin 67 is carried on a trigger lever 69 that is pivoted at 70 on the chassis plate 15. The trigger lever 69 and the latch pin 67 are urged into latch engaging position by a trigger spring 71 that is connected to the trigger lever 69. A trigger release pin 72 is carried at one end of the trigger lever 69 and projects in the path of a coin as the coin leaves the exit of the coin chute 30. The release pin 72 also extends through an arcuate slot 73 in the coin receiving member.

As a released coin passes from the exit of the coin chute 30 into the coin receiving member 54, it strikes and depresses the trigger release pin 72. This raises the latch pin 67 out of engagement with the latch 68 and permits the coin receiving member 54 to be rotated by a spring 74 to a coin measuring or discharging position as shown in Fig. 2.

The spring 74 is connected between the coin releasing member 54 and the power lever 40 and is energized by the movement of the power lever and also by rotation of the coin receiving member 54 to its coin receiving position. During rotation of the coin receiving member 54, the trigger release pin 72 engages with the edge of the arcuate slot 73 and follows a path defined thereby to hold the latch pin 67 away from the periphery of the coin receiving member 54 until the latch 68 has been passed and then permits the latch pin 67 to engage with the latch 68.

The trigger lever 69 also has a curved arm 75 that projects upwardly therefrom and is positioned for engagement with a pin 76 carried on the yoke 55 of the shiftable clutch mechanism under certain conditions. If the latch pin 67 has not been released from the latch 68 by the passage of a released coin from the exit of the coin chute 30 into the coin receiving member 54, the pin 76 will strike the arm 75 as the clutch mechanism 43 moves back into advanced position. This depresses the trigger lever 75 and releases the latch pin 67 from the latch 68 permitting the coin-receiving member 54 to be returned to its rest or coin discharging position without a coin. This will also function to release the trigger if a coin fails to release the trigger. This would occur before the clutch 43 reaches the position shown in Fig. 1, but in order to illustrate the parts more clearly the clutch mechanism has been shown at or approaching its advanced position and with the coin receiving member in cocked or coin receiving position.

Figure 13:
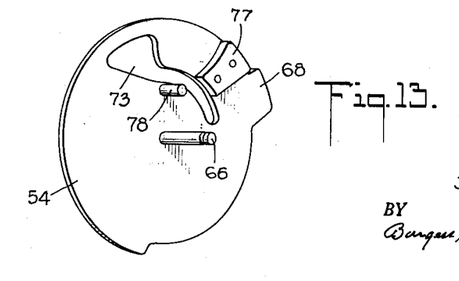
Fig. 13 is a perspective view of one of the parts of the meter mechanism illustrated in Fig. 1.

Referring now to Fig. 13, the coin receiving member 54 carries a coin hammer 77 and a coin supporting pin 78 on its surface facing the chassis plate 15. The edge of the coin hammer 77 and the coin supporting pin 78 form a pocket into which a released coin passes from the exit of the coin chute 30. The coin hammer 77 engages with the rear edge of the coin and the bottom of the coin rests on the pin 78 as the coin receiving member 54 is rotated to its coin releasing position. The pin 78 also extends through an arcuate slot in the chassis plate 15 and acts as a stop for the coin receiving member 54 when it reaches its rest position.

The edge of the coin when it is supported in this pocket projects beyond the periphery of the coin receiving member 54 and is contacted by a spring-biased seating pawl 79 as the coin receiving member 54 starts to rotate to insure that the coin is fully seated in the pocket formed by the coin hammer 77 and the pin 78. The coin seating pawl 79 is pivoted on the chassis plate 15 at 80 and is urged into engagement with the edge of the coin by a spring 81.

As the coin carried by the coin receiving member 54 moves past the seating pawl, the edge of the coin engages with one end of an indicator latch 82 which traces or follows the diametrical profile of the coin as the coin moves to discharge position. The indicator latch 82 is pivoted at 82a on the chassis plate 15 and is held against the edge of the coin and in indicator engaging position by the tension of a spring 83.

Figure 8:
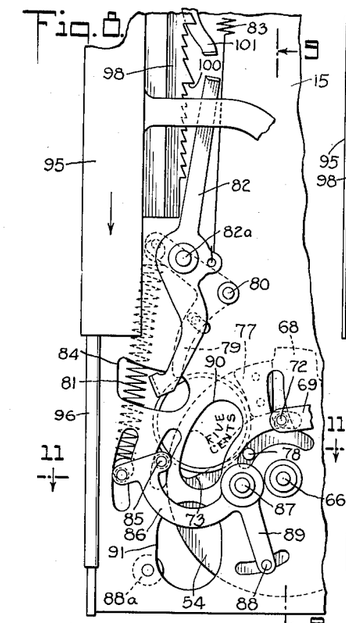
Fig. 8 is a fragmentary view showing a portion of the meter mechanism illustrated in Fig. 1 with the indicator latch being shown in a nickel overtravel position.
Figure 9:
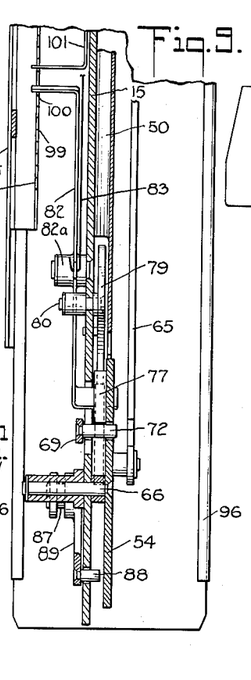
Fig. 9 is a section view taken along the line 9—9 of Fig. 8.
Figures 10, 11:
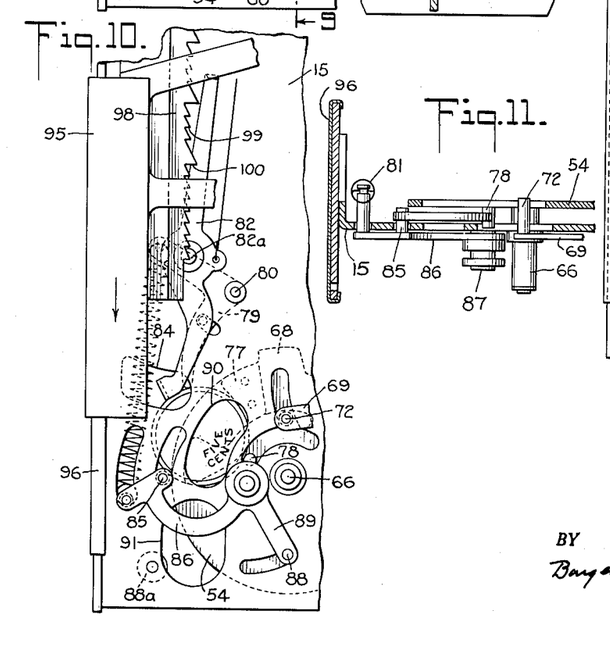
Fig. 10 is a fragmentary view corresponding to Fig. 8 with the indicator latch being shown in its nickel rest position
Fig. 11 is a section view taken along the line 11—11 of Fig. 8.
Figure 12:
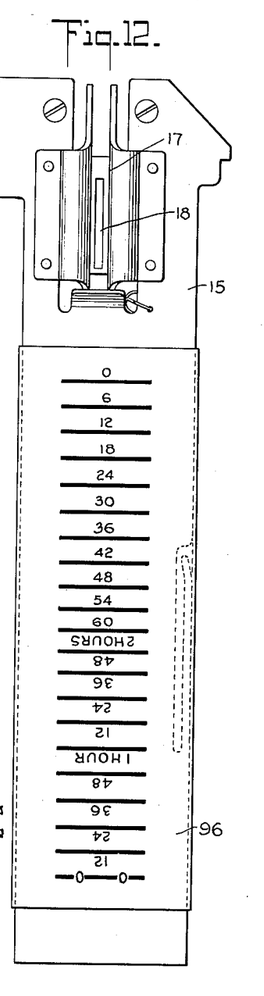
Fig. 12 is an end view of a portion of the meter mechanism illustrated in Fig. 1.

The latch 82 is arranged so that its end which engages with the coin and passes over the diameter of the coin, remains in contact with the edge of the coin after the coin is at rest at the coin discharging position. This causes the indicator latch 82 to be moved to a plurality of indicator engaging positions by its engagement with a coin carried by the coin receiving member. The indicator latch 82 is also moved to different indicator engaging positions by coins of denominations having different diameters. For example, a penny will move the latch 82 to an overtravel position indicated by the dot and dash lines in Fig. 2 and will then maintain the latch at a rest position as indicated by the full lines in Fig. 2. A nickel will move the latch 82 to an overtravel position as shown in Fig. 8 and will maintain the latch 82 in a rest position as shown in Fig. 10. If no coin is present in the coin receiving member, the latch 82 assumes still another indicator engaging position where it is held by the coin contacting end of the latch engaging with the edge of an aperture 84 in the chassis plate 15 as shown in Fig. 1.

Just prior to the coin receiving member 54 reaching its coin discharging position, the coin strikes a coin-supporting pin 85 that is yieldably supported in the path of the coin and the pin 85 is moved by engagement with the coin to coin supporting position. The coin supporting pin 85 is carried by one arm of a lever 86 that is pivoted on the chassis plate 15 at 87. The arm of the lever 86 carrying the pin 85 is also connected to one end of the spring 81 that acts on the coin seating pawl 79. The spring 81 yieldably holds the lever 86 and the pin 85 in coin engaging position. When the coin rotating member reaches coin discharging position, the pin 85 and the lever 86 are depressed by the coin with the coin being supported at its rest position by the coin supporting pin 85 and the coin supporting pin 78 on the coin receiving member 54 which are now spaced apart by a distance less than the diameter of the coin, as will be seen in Figs. 2, 8 and 10.

When the next coin is inserted in the meter and the coin receiving member 54 is once again rotated to its coin receiving position, the coin supporting pin 78 carried thereon is moved out of its coin supporting position and the coin is permitted to roll off of the pin 85 and fall by its own weight to a second position where it is held by a pin 88 and a post 88a on the chassis plate 15. The pin 88 is carried by an arm 89 extending from the lever 86 and it moves into coin supporting position upon the coin supporting pin 85 being released and returned by the spring 81 to its coin engaging position.

Apertures 90 and 91 are provided in the chassis plate 15 so that a coin held at either the discharge position or at the second holdout position is displayed at the respective positions and may be observed through a viewing aperture (not shown) in the meter housing 16.

When a coin is supported at the second holdout position, it can only be released therefrom by the engagement of a coin with the coin supporting pin 85 so as to depress the pin 85 and the lever 86 in order to move the pin 88 out of coin supporting position as shown best in Fig. 10. Since a coin that is held in the holdout position can only be released therefrom by the deposit of another coin in the meter, this makes it impossible for a slug to be deposited in the meter and then released from view by simply inserting a coin or other instrumentality in the entrance slot of the meter to recock the coin receiving member 54 without actually releasing the coin into the coin chute 30.

The flag or indicator 62 is slidably mounted on a rod 93 that is supported by brackets 94 extending from the chassis plate 15. The indicator has two flags 95, one of which is located on each side of the chassis plate 15. The flags 95 may be painted red and in conjunction with scales 96 denote the passage of time during the operation of the meter after they have been moved from a violation position to a purchased-timed position. The scales 96 and the flags 95 are visible through apertures 97 in the housing 16 and when the flags 95 reach the violation position, they conceal the scales 96 and are readily observable from the exterior of the meter on two sides thereof to denote a parking violation.

The scales 96 are slidably mounted on the sides of the chassis plate 15 and are held in place by frictional engagement therewith. The scales illustrated have two sets of different time indicating graduations thereon and the time graduations cooperating with the indicator flags may be changed by sliding the scales 96 from the sides of the chassis plate and reversing them end for end. This permits the parking period for a given movement of the indicator to be readily changed. Such changes in the scales will require that the timer mechanism 58 be adjusted accordingly and this may be done in the customary manner through changes of gearing or the like. Provisions for such adjustment of the timer mechanism are well known and form no part of this invention.

Figure 14:
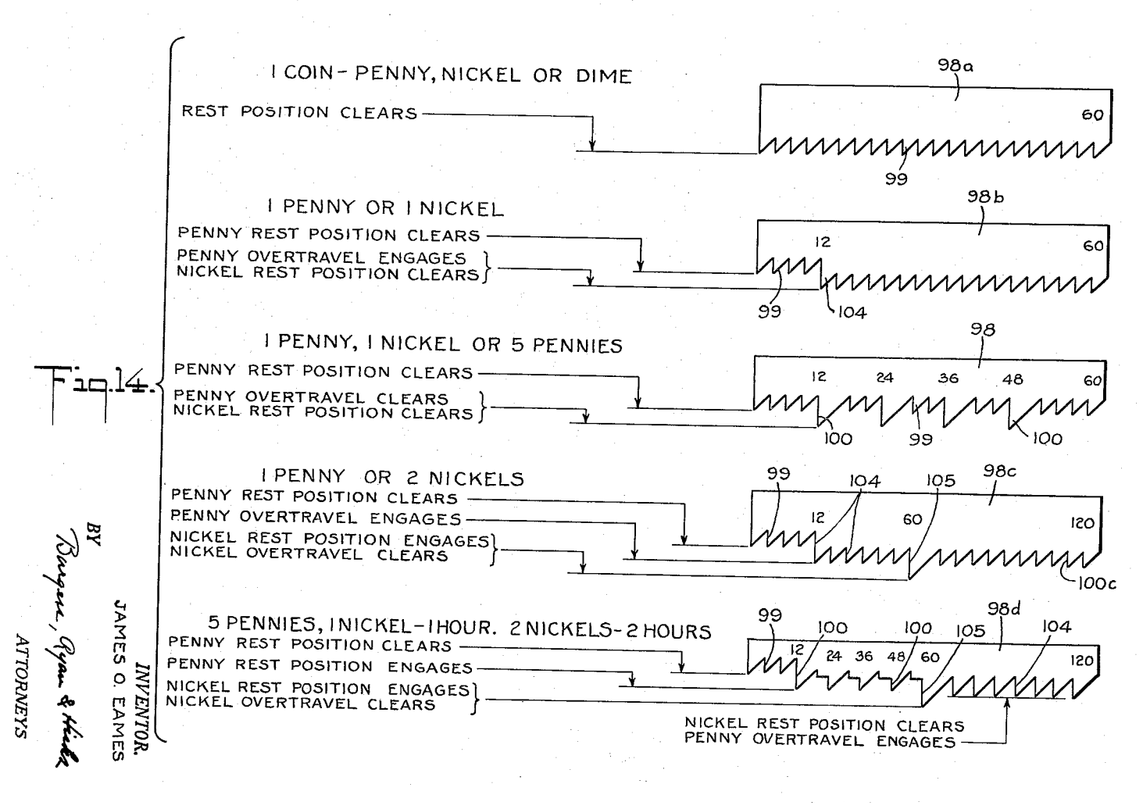
Fig. 14 is a series of schematic illustrations indicating various operating conditions obtainable with the meter mechanism illustrated in Fig. 1.

The indicator 62 carries latch engaging means in the form of a rack 98 that is engaged by one end of the indicator latch 82 to support the indicator at purchased-time positions and at other positions of the indicator. The rack 98 may take various forms, as illustrated in Fig. 14, depending on the operating characteristics desired in the meter. However, in the various forms illustrated the rack 98 may have a series of short ratchet teeth 99 that engage with the indicator latch 82 when there is no coin held at rest and engaging with the end of the indicator latch at the coin releasing position of the coin receiving member 54. Under such conditions the indicator latch 82 engages with the short ratchet teeth 99 on the rack and this also occurs on the rotation of the coin receiving member 54 to coin receiving position. The latch then remains in engagement with the short ratchet teeth 99 until the next coin has been deposited in the meter and engages with the indicator latch. This precludes any possibility of obtaining parking time by insertion of a coin or other instrumentality in the coin slot 17 without releasing the coin and permitting it to pass through the coin chute 30.

In addition to the short ratchet teeth 99, the rack 98, as illustrated in Figs. 1, 2, 8 and 9, also has a series of spaced ratchet teeth 100 of greater length than the short teeth 99. The long ratchet teeth 100 engage with the indicator latch 82 at the rest position of the latch 82 for a penny but are cleared by the overtravel position of the latch 82 for a penny and the rest or overtravel position of the latch for a nickel. The long teeth 100 are spaced to correspond to appropriate intervals of time. If they are spaced a distance apart corresponding to twelve minute intervals, a period not greater than twelve minutes of parking time may be purchased by a deposit of a penny in the meter and up to five pennies may be deposited in sequence to purchase an hour of parking time, or fraction thereof depending on the number of pennies deposited. The deposit of one nickel, however, will purchase a full hour parking time. Other arrangements of the rack 98 will be described hereinafter in connection with Fig. 14.

In addition to the indicator latch 82, a brake 101 normally engages with the ratchet teeth on the rack 98. The brake 101 is pivoted on the chassis plate 15 at 102 and is counterbalanced to engage with the rack 98 by its own weight. The brake 101 carries an adjustable eccentric pin 103 that is engaged by the end of the time delay quadrant 44 to release the brake 101 from engagement with the rack 98 when a coin has been deposited in the meter.

While the brake 101 is released from engagement with the indicator 62, the indicator latch 82 is then moved to its overtravel and rest positions by the deposited coin permitting the indicator 62 to be moved, in this case by gravity, to a purchased time position corresponding to the denomination of the coin deposited. The movement of the indicator latch 82 first to its overtravel position and then to its rest position under the influence of a coin carried by the coin receiving member 54 takes place practically instantaneously particularly as both the coin receiving member and the indicator latch are spring actuated. The indicator latch thus returns to its rest position before the indicator has dropped under the influence of gravity a distance corresponding to the period of time purchased by the denomination of the coin deposited in the meter. The ratchet teeth on the rack 98 are shaped so that the brake 101 and the latch 82 will slide over them as the indicator is raised.

By utilizing various lengths of teeth on the rack 98 the distance that the indicator 62 will be dropped by any particular denomination of coin may be readily controlled. This may be accomplished by using teeth, such as the teeth 100, of a length that engage with the indicator latch 82 at the rest position of a coin for one denomination such as a penny, but which are cleared by the overtravel position of the latch 82 for the penny and by the rest and overtravel positions of the latch for coins of another denomination having a larger diameter, such as a nickel. In addition, as illustrated in Fig. 14, teeth 104 that are longer than the teeth 100 may be added to the rack. The teeth 104 engage with the indicator latch 82 at both the rest and overtravel positions of latch for a penny but are cleared by the rest and overtravel positions of the latch for a nickel. Such teeth 104 prevent the indicator 62 from dropping beyond them in response to the deposit of a coin having a smaller diameter than a coin of the denomination specified for the purchase of a stated parking period.

In addition ratchet teeth 105 that are longer than the teeth 104 may also be added to the rack 98. These teeth 105 will engage with the indicator latch 82 at the rest and overtravel position of the latch for a penny and at the rest position of the latch for a nickel but will be cleared at the overtravel position of the latch for a nickel. Such teeth prevent the indicator 62 from dropping the full distance in response to the deposit of one nickel and have particular application to a two-hour meter as indicated in the lower two views of Fig. 14.

Referring to Fig. 14, a number of different arrangements of the ratchet teeth just described are illustrated diagrammatically with brief explanations of their latch engaging characteristics. In Fig. 14, the parking periods that might be purchased by the deposit of pennies or nickels in the meter have been designated at the appropriate teeth. However, these numerals do not appear on the rack but are on the scales 96. It will be understood that the coins and the periods designated may be changed as desired. It will also be understood, that since the indicator 62 is being raised by the rotary motion of the clutch mechanism 43 that the time graduations on the scales 96 and the spacing of the teeth on the rack 98 should be arranged accordingly.

Referring now to the racks shown in Fig. 14, in the top view a rack 98a is shown that may be used when the meter to be operated for the entire parking period allowed by the deposit of a single coin of any desired denomination such as a penny, a nickel or a dime. The rack 98a has only the short ratchet teeth 99a that are cleared by indicator latch 82 at both the rest and overtravel positions of the latch for the appropriate coin. Such teeth being engaged by the latch 82 when a coin is not at the rest position.

In the second view, a rack 98b is shown that permits the meter to be operated for a short parking period by the deposit of one penny or for a proportionately longer period by the deposit of a nickel. In the third view, the rack 98 is shown and since this rack has previously been described, it need not be described here.

In the fourth view, a rack 98c is shown that permits the meter to be operated for a short parking period by one penny and a proportionately longer parking period by a nickel or for a period twice as long as the period obtained by the first nickel by the deposit of a second nickel. However, the period purchased by the second nickel or any part of thereof cannot be purchased by a penny.

In the fifth view, a rack 98d is shown that permits the meter to be operated progressively by depositing one to five pennies to purchase proportionate periods of the first hour or by one nickel to purchase the first hour of parking time and then by the deposit of a second nickel to purchase the second hour of parking time.

The operation of the meter that has been described will now be briefly summarized. When a coin is inserted edgewise through the coin slot 17 and is pushed against the door 18, the door supporting strut 19 and the actuator lever 21 are forced inward. The resulting movement of the actuator lever 21 energizes the power spring 41; rotates the shiftable clutch mechanism 43 to its overtravel position; swings the time-delay quadrant 44, freely turning gear 46 of the impact escapement 48; and rotates the coin receiving member 54 to its coin receiving position at the exit end of the coin chute 30. It also raises the door closing lever 31 from engagement with the door supporting strut 19 and finally releases the brake 101 from engagement with the indicator 62 after the coin receiving member has released the previous coin and the latch 82 has moved into engagement with the teeth 98. As the thrust of the coin completes the inward movement of the actuator lever 21, the latch 26 securing the door strut 19 to the actuator lever 21 is released permitting the door strut 19 to swing upwardly so that the coin may drop into the coin chute 30. When the coin drops into the coin chute 30 the actuator lever 21 is returned to its initial position by the actuator spring 23 and the door supporting strut 19 with the door 18 are also returned to their initial positions by the door closer 31 and the door closer spring 33 at which time the door latch 26 is re-engaged.

The power spring 41 which has been energized now acts to return the clutch mechanism 43 to its advanced position but such movement is retarded by the impact escapement 48 acting on the time-delay quadrant 44 until the indicator 62 has been dropped to the purchased-time position.

The released coin passes through the coin chute 30 by gravity and is finally supported in a pocket in the rotatable coin receiving member 54. As the coin passes from the exit of the coin chute 30 to the coin receiving member 54, it strikes the trigger release pin 72 thus releasing the pin 67 from the latch 68 permitting the coin receiving member 54 to be rotated to its coin releasing position by the spring 74.

As the coin receiving member 54 is rotated to its coin releasing position the edge of the coin carried thereby contacts with the end of the indicator latch 82 and the end of the latch 82 traces a portion of the circumferential profile of the coin during this movement of the coin. This moves the indicator latch to overtravel and rest positions that vary for coins of denominations having different diameters. Depending on the coin deposited the movement of the indicator latch 82 to the overtravel and rest positions releases the latch from engagement with ratchet teeth of the rack 98 carried by the indicator 62 and permits the indicator 62 to drop to a purchased time position corresponding to the coin deposited. When the clutch mechanism which is being moved toward its advanced position from its overtravel position engages with the indicator at a purchased time position, the weight of the indicator engages the clutch pawl 60 with the ratchet wheel 56. Thereafter the movement of the clutch and the indicator by the power spring 41 continues at the rate controlled by the timer 58 until the indicator reaches its violation indicating position. The timer 58 may also be started by insertion of a coin in the meter and stopped after the indicator reaches violation position, as by means such as are described and illustrated in said copending application.

The deposited coin is supported at the rest position (the coin release position of the coin receiving member 54) until the coin receiving member 54 is once again rotated to its coin receiving position by the insertion of the next coin. When this happens, the first coin falls to a second holdout position where it is supported until another coin is carried to the rest position by the coin receiving member.

It will be apparent that various changes and modifications may be made in the embodiment of the invention illustrated and described herein without departing from the scope of the following claims. For example, while a penny and nickel have been mentioned it will be obvious that coins of other denominations, domestic and foreign, having different diameters may be used to operate the meter.

I claim:

1. In a parking meter of the kind including a coin slot accessible to the parker and adapted for edgewise insertion of a coin therein, a coin chute within the meter for guiding the gravity fall of a coin after it has passed through the coin slot, an indicator movable between a violation position and a purchased-time position, said indicator being biased for movement to said purchased-time position thereof, energy-storing means adapted to be moved in one direction for potentially energizing the same and movable in the reverse direction when energized to apply its energy to move the indicator from the purchased-time position to violation position, and a timer mechanism for controlling the movement of the indicator by the energy-storing means, the improvement which comprises a coin-operated mechanism located at the coin slot and operable by a coin inserted in the coin slot, with the energy-storing means being movable by said coin-operated mechanism in a direction to store potential energy therein by insertion of a coin in the coin slot, a shiftable clutch mechanism connected to said energy-storing means, said clutch mechanism being shiftable from an advanced position to an overtravel position by the coin-operated mechanism upon energization of the energy-storing means and being operable upon engagement with the indicator to connect the timer to the energy-storing means, a clutch-operating lever carried by the clutch mechanism and positioned for engagement by the indicator upon movement of the indicator to purchased-time position, an indicator latch normally preventing indicator movement to a purchased-time position, said latch having a portion positioned for engagement with an edge of the inserted coin at a point remote from the coin slot and being movable by engagement with said coin to an indicator-releasing position, and means for controlling the rate of expenditure of energy by the energy-storing means prior to operation of the clutch by the clutch operating lever, said retarding means being connected to the energy-storing means and being rendered operable on energization of the energy-storing means.

2. In a parking meter of the kind including a coin slot accessible to the parker and adapted for edgewise insertion of a coin therein, a coin chute within the meter for guiding the gravity fall of a coin after it has passed through the coin slot, an indicator movable between a violation position and a purchased-time position, said indicator being biased for movement to said purchased-time position thereof, energy-storing means adapted to be moved in one direction for potentially energizing the same and movable in the reverse direction when energized to apply its energy to move the indicator from the purchased-time position to violation position, and a timer mechanism for controlling the movement of the indicator by the energy-storing means, the improvement which comprises a coin-operated mechanism located at the coin slot, with the energy-storing means being movable by said coin-operated mechanism in a direction to store potential energy therein upon insertion of a coin in the coin slot, a shiftable clutch mechanism connected to said energy-storing means, said clutch mechanism being shiftable by the coin-operated mechanism from an advanced position, through different indicator engaging positions to an overtravel position upon energization of the energy-storing means and being operable upon engagement with the indicator to connect the timer to the energy-storing means, a clutch-operating lever carried by the clutch mechanism and positioned for engagement with the indicator upon movement of the indicator to purchased-time position, an indicator latch normally preventing indicator movement to purchased-time position, said latch having a portion positioned for engagement with an edge of the inserted coin at a point remote from the coin slot and being movable by engagement with said coin to an indicator-releasing position, a brake normally engaging with and supporting the indicator preventing indicator movement toward purchased-time position, brake-realeasing means operable by the coin-operated mechanism for releasing the brake from the indicator during the movement of the indicator latch to indicator-releasing position and retarding means for controlling the rate of expenditure of energy by the energy-storing means in moving the clutch back from its overtravel position to an indicator-engaging position, said retarding means being connected to the energy-storing means and being rendered operable on energization of the energy-storing means.

3. In a parking meter of the kind including a coin slot accessible to the parker and adapted for edgewise insertion of a coin therein, a coin chute within the meter for guiding the gravity fall of a coin after it has passed through the coin slot, an indicator movable between a violation position and a purchased-time position, said indicator being biased for movement to said purchased-time position thereof, energy-storing means adapted to be moved in one direction for potentially energizing the same and movable in the reverse direction when energized to apply its energy to move the indicator from the purchased-time position to violation position, and a timer mechanism for controlling the movement of the indicator by the energy-storing means, the improvement which comprises a coin-operated mechanism located at the coin slot and operable by a coin inserted in the coin slot, with the energy-storing means being movable by said coin-operated mechanism in a direction to store potential energy therein upon insertion of a coin in the coin slot, a shiftable clutch mechanism connected to said energy-storing means, said clutch mechanism being movable from an advanced position, through different indicator engaging positions, to an overtravel position by the coin-operated mechanism upon energization of the energy-storing means, a clutch-operating lever carried by the clutch mechanism and positioned for engagement with the indicator upon movement of the indicator to purchased-time position, said clutch mechanism being operable upon engagement of said lever with the indicator to connect the energy-storing means to the timer mechanism, a rotatable coin-receiving member located at the exit of the coin chute, said coin-receiving member being rotatable for moving the coin after passage through the coin chute to a coin-releasing position, a pivoted indicator latch having an end engaging with and tracing the periphery of the coin as the coin is moved to the coin-releasing position and having an end normally engaging with the indicator and preventing movement of the indicator toward purchased-time position, said latch being movable by engagement with the coin to an indicator-releasing position and means for controlling the rate of movement of the clutch by the energy-storing means back from the overtravel position thereof to an indicator-engaging position thereof.

4. In a parking meter of the kind including a coin slot accessible to the parker and adapted for edgewise insertion of coins of different diameters therein, a coin chute within the meter for guiding the gravity fall of a coin after it has passed through the coin slot, an indicator movable between a violation position and different purchased-time positions corresponding to the denomination of the inserted coin, said indicator being biased for movement to said purchased-time position, energy-storing means adapted to be moved in one direction for potentially energizing the same and movable in the reverse direction when energized to apply its energy to move the indicator from purchased-time to violation position, and a timer mechanism for controlling the movement of this indicator by the energy-storing means, the improvement which comprises a coin-operated mechanism located at the coin slot, said mechanism being operable by coins of different denominations inserted in the coin slot, with the energy-storing means being movable by the coin-operated mechanism in a direction for potentially energizing the energy-storing means upon insertion of a coin in the coin slot, a shiftable clutch mechanism connected to said energy-storing means, said clutch mechanism being movable from an advanced position, through different indicator engaging positions, to an overtravel position upon energization of the energy-storing means, a clutch-operating lever carried by the clutch mechanism and positioned for engagement with the indicator upon movement of the indicator to purchased-time position to connect the energy-storing means to the timer mechanism, an indicator latch normally engaging with the indicator and preventing indicator movement toward purchased-time position, said latch having a portion positioned for engagement with an edge of the inserted coin at a point remote from the coin slot and being movable to a plurality of different positions relative to the indicator by engagement with coins of different denominations and having different diameters and means for controlling the rate of expenditure of energy by the energy-storing means in moving the clutch from its overtravel position to an indicator-engaging position, said retarding means being connected to the energy-storing means and being rendered operable on energization of the energy-storing means.

5. In a parking meter of the kind including a coin slot accessible to the parker and adapted for edgewise insertion of coins of different diameters, a coin chute within the meter for guiding the gravity fall of a coin after it has passed through the slot, an indicator movable between a violation position and different purchased-time positions, said indicator being biased to said purchased-time positions, energy-storing means adapted to be moved in one direction for potentially energizing the same and movable in the reverse direction when energized to apply its energy to move the indicator from purchased-time to violation position, and a timer mechanism for controlling the movement of the indicator by the energy-storing means, the improvement which comprises a coin-operated mechanism located at the coin slot, said mechanism being operable by a coin inserted in the coin slot, with the energy-storing means being movable in the direction for storing energy therein by the coin-operated mechanism upon insertion of a coin in the coin slot, a shiftable clutch for connecting the energy-storing means to the timer mechanism and being movable from an advanced position, through different indicator engaging positions, to an overtravel position upon energization of the energy-storing means, a clutch-operating member carried by the clutch mechanism, said clutch-operating member being positioned for engagement with the indicator upon movement of the indicator to purchased-time position and being operable upon engagement therewith to connect the energy-storing means to the timer mechanism, an indicator latch normally engaging with the indicator and preventing indicator movement toward purchased-time position, said latch having a portion positioned to contact an edge of the inserted coin at a point remote from the coin slot and being movable to different positions relative to the indicator by coins of different diameters, latch-engaging means carried by the indicator, said latch-engaging means engaging with the latch at one of the positions of the latch upon movement of the indicator to a purchased-time position corresponding to the denomination of the inserted coin and means for controlling the rate of expenditure of energy by the energy-storing means in moving the clutch back from its overtravel position to an indicator-engaging position, said retarding means being connected to the energy-storing means and being rendered operable on energization of the energy-storing means.

6. In a parking meter of the kind including a coin slot accessible to the parker and adapted for edgewise insertion of a coin therein, a coin chute within the meter for guiding the gravity fall of a coin after it has passed through the coin slot, an indicator movable between a violation position and a purchased-time position, energy-storing means adapted to be moved in one direction for potentially energizing the same and movable in the reverse direction when energized to apply its energy to move the indicator from the purchased-time position to violation position, and a timer mechanism for controlling the movement of the indicator by the energy-storing means, the improvement which comprises a pivoted actuator lever located at the coin slot, said actuator lever being connected to the energy-storing means and being movable by insertion of a coin in the coin slot in a direction to store potential energy in the energy-storing means, a shiftable clutch mechanism connected to the energy-storing means and to the actuator lever, said clutch mechanism being movable by the actuator lever from an advanced position, through different indicator engaging positions, to an overtravel position upon energization of the energy-storing means and including an indicator-engaging arm and a clutching member operable by said arm upon engagement of the indicator-engaging arm with the indicator at a purchased-time indicating position of the indicator to connect the energy-storing means to the timer mechanism, a coin-operated indicator latch normally engaging with the indicator and preventing movement of the indicator to a purchased-time position, said latch having a portion positioned for engagement with an edge of the inserted coin at a point remote from the coin slot and being movable thereby to an indicator-releasing position and means for controlling the rate of expenditure of energy by the energy-storing means in moving the clutch back from its overtravel position to an indicator-engaging position, said retarding means being connected to the energy-storing means and being rendered operable on energization of the energy-storing means.

7. In a parking meter mechanism of the character described having a coin slot accessible to the parker for edgewise insertion of a coin into the meter, the combination which includes an indicator movable between a violation position and different purchased-time positions, said indicator being biased to said purchased-time positions, energy-storing means for moving the indicator from purchased-time to violation position, a timer mechanism for controlling the movement of the indicator by the energy-storing means at a timed rate, a shiftable clutch connected to the energy-storing means and being movable from an advanced position, through different indicator engaging positions, to an overtravel position upon energization of the energy-storing means, a clutch-operating member carried by the clutch and positioned for engagement with the indicator at a purchased-time indicating position of the indicator, said member being operable by engagement with the indicator to connect the energy-storing means to the timer, a coin-operated mechanism operable by the insertion of a coin in the coin slot, said mechanism having operative connections with the energy storing means for energizing the energy-storing means and shifting the clutch to the overtravel position thereof upon insertion of a coin in the coin slot, an indicator latch normally engaging with the indicator and preventing movement of the indicator to purchased-time position, said indicator latch having a portion positioned to contact with the edge of the coin at a point remote from the coin slot and being movable to a number of different releasing positions relative to the indicator by coins of denominations having different diameters, and means connected to the energy-storing means for controlling the rate of expenditure of energy thereby in moving the clutch back from its over-travel position to an indicator-engaging position.

8. In a parking meter mechanism the combination as defined in claim 7 which includes a rotatable coin receiving member positioned to receive the coin after insertion of the coin through the coin slot, said coin-receiving member being connected to the coin-operated mechanism for rotation to coin receiving position and being spring urged for rotation in the opposite direction, said rotation of the coin in said last mentioned direction engaging the edge of the coin with the indicator latch and moving the indicator latch to a number of different positions relative to the indicator.

9. In a parking meter mechanism of the character described having a coin slot accessible to the parker for edgewise insertion of a coin into the meter, the combination which includes an indicator movable between a violation position and different purchased-time positions, said indicator being biased to said purchased-time positions, energy-storing means for moving the indicator from purchased-time to violation position, a timer mechanism for controlling the movement of the indicator by the energy-storing means at a timed rate, a shiftable clutch for connecting the energy-storing means to the timer and having an operating member positioned for engagement with the indicator at a purchased-time position of the indicator, said clutch being movable from an advanced position, through different indicator engaging positions, to an overtravel position upon energization of the energy-storing means and being movable in an opposite direction by the energy-storing means, a coin-operated mechanism operable by the insertion of a coin in the coin slot, said mechanism having operative connections with the energy-storing means for energizing the energy-storing means and shifting the clutch to the overtravel position upon insertion of a coin, an indicator latch normally engaging with the indicator and preventing movement of the indicator to purchased-time position, said indicator latch having a portion positioned to contact with the edge of the coin after insertion thereof through the coin slot and being movable to a number of different positions relative to the indicator by coins of denominations having different diameters, a brake normally engaging with the indicator and preventing indicator movement toward purchased-time position, brake-releasing means connected to the energy-storing means, said brake-releasing means engaging with and releasing the brake from the indicator during the movement of the indicator latch from engagement with the indicator by a coin and means for controlling the rate at which the energy-storing means expends energy in moving the clutch back from its overtravel position to an indicator-engaging position.

10. In a parking meter of the type having a coin slot accessible to the parker and adapted for edgewise insertion of a coin therein, a coin chute within the meter for receiving and guiding the gravity fall of a coin after it has passed through the coin slot, a movable indicator, said indicator being movable by gravity from a violation position to different purchased-time positions, energy-storing means adapted to be moved in one direction for potentially energizing the same and being movable in the reverse direction when energized to apply its energy to move the indicator from the purchased-time position to violation position, and a timer mechanism for controlling the movement of the indicator by the energy-storing means, the combination which includes coin-operated means located at the coin slot and operable by a coin inserted in the coin slot for storing potential energy in the energy-storing means, coin controlled latch means normally engaging with the indicator and being arranged to prevent movement of the indicator toward purchased-time position thereof, said latch means being movable to an overtravel position and a rest position by a coin of a given diameter, said positions differing for coins of different diameters, a second coin-operated means connected to the first coin-operated means and movable thereby to a position to receive a coin from said first coin-operated means, said second coin-operated means including a source of power for moving said second coin-operated means with a coin therein in a path where an edge of the coin contacts with and moves the latch means in sequence to said overtravel and rest positions and latch engaging means on the indicator.

11. In a parking meter of the kind including a coin slot accessible to the parker and adapted for edgewise insertion of a coin therein, a coin chute within the meter for guiding the gravity fall of a coin after it has passed through the coin slot, an indicator movable between a violation position and a purchased-time position, said indicator being biased for movement to said purchased-time position thereof, energy-storing means adapted to be moved in one direction for potentially energizing the same and movable in the reverse direction when energized to apply its energy to move the indicator from the purchased-time position to the violation position, and a timer mechanism for controlling the movement of the indicator by the energy-storing means, the improvement which comprises a coin-operated mechanism located at the coin slot and operable by a coin inserted in the coin slot, with the energy-storing means being movable by said coin-operated mechanism in a direction to store potential energy therein by insertion of a coin in the coin slot, a shiftable clutch mechanism connected to said energy-storing means, said clutch mechanism being shiftable from an advanced position, through different indicator engaging positions, to an overtravel position by the coin-operated mechanism upon energization of the energy-storing means and being operable upon engagement with the indicator at the purchased-time positions of the indicator to connect the timer to the energy-storing means, a clutch-operating lever carried by the clutch mechanism and positioned for engagement by the indicator, and indicator latch normally preventing indicator movement toward purchased-time position, said latch having a portion positioned for engagement with an edge of the inserted coin at a point remote from the coin slot and being movable by engagement with said coin to an indicator-releasing position, and retarding means for controlling the rate of expenditure of energy by the energy-storing means prior to operation of the clutch by the indicator-engaging means, said retarding means being connected to the energy-storing means and being rendered operable on energization of the energy-storing means, said last mentioned means permitting the movement of the clutch from the overtravel position to an indicator-engaging position at a rate in excess of the rate of movement of the clutch when connected to the timer.

12. In a parking meter of the kind including a coin slot accessible to the parker and adapted for edgewise insertion of a coin therein, a coin chute within the meter for guiding the gravity fall of a coin after it has passed through the coin slot, an indicator movable between a violation position and a purchased-time position, said indicator being biased for movement to said purchased-time position thereof, energy-storing means adapted to be moved in one direction for potentially energizing the same and movable in the reverse direction when energized to apply its energy to move the indicator from the purchased-time position to violation position, and a timer mechanism for controlling the movement of the indicator by the energy-storing means, the improvement which comprises a coin-operated mechanism located at the coin slot and operable by a coin inserted in the coin slot, with the energy-storing means being movable by said coin-operated mechanism in a direction to store potential energy therein by insertion of a coin in the coin slot, a shiftable clutch mechanism connected to said energy-storing means, said clutch mechanism being shiftable from an advanced position to an overtravel position by the coin-operated mechanism upon energization of the energy-storing means and being operable upon engagement with the indicator at the purchased-time positions of the indicator to connect the timer to the energy-storing means, a clutch-operating lever carried by the clutch mechanism and positioned for engagement by the indicator, an indicator latch normally preventing indicator movement toward purchased-time position, said latch having a portion positioned for engagement with an edge of the inserted coin at a point remote from the coin slot and being movable by engagement with said coin to an indicator-releasing position, and retarding means for controlling the rate of expenditure of energy by the energy-storing means prior to operation of the clutch by the indicator-engaging means, said retarding means being connected to the energy-storing means and being rendered operable on energization of the energy-storing means, said last mentioned means including a time-delay quadrant connected to and movable by the energy-storing means, a rack carried by said time-delay quadrant, an impact escapement, a shaft connected to said escapement and a spur gear carried by said shaft and engaging with the rack on the time-delay quadrant, said gear being rotatable on the shaft by movement of the quadrant upon energization of the energy-storing means and being held against rotation relative to the shaft when moved in the opposite direction.

13. In a parking meter mechanism of the character described wherein an indicator is movable from a violation position to a number of different purchased-time positions, the combination which includes a coin chute located within the meter for receiving and guiding a coin deposited in the meter, said chute having an entrance at one end and an exit at the other end thereof, a rotatable coin-receiving member located at the exit end of the coin chute for receiving a coin therefrom, means for rotating said coin-receiving member from a coin-receiving position to a coin-releasing position and a pivoted indicator latch normally engaging with the indicator and preventing movement of the indicator toward purchased-time position, said latch having a portion contacting with the edge of a coin in the coin-receiving member upon the movement thereof to coin-releasing position and being movable by said coin to an indicator-releasing position and to an indicator-engaging position, said positions of the latch being different for coins of denominations having different diameters.

14. In a parking meter mechanism, the combination as defined in claim 13 wherein the means for rotating the coin-receiving member includes a spring connected to the rotatable coin-receiving member, said spring being loaded when the coin-receiving member is in coin-receiving position and tending to rotate the coin-receiving member to coin-releasing position, a latch carried by the coin-receiving member, and a coin-operated trigger engaging with the latch in the coin-receiving position of said member and holding the coin-receiving member against rotation in said position, said trigger having a portion thereof disposed in the path of a coin passing from the coin chute to the coin-receiving member and being releasable from engagement with said latch upon engagement by a coin.

15. In a parking meter of the automatic type having a coin slot accessible to the parker and adapted for edgewise insertion of coins of different diameters therein, a coin chute within the meter for receiving and guiding the gravity fall of a coin after it has passed through the coin slot and an indicator movable between a violation position and a plurality of purchased-time positions, the improvement which comprises a pivoted indicator latch engaging with and holding the indicator against movement towards a purchased-time position, said latch being movable by coins of different diameters to a number of different positions relative to the indicator and having one end positioned to contact with an edge of a coin at a point remote from the coin slot, a rotatable coin-receiving member positioned to receive a coin from the coin chute, said member having a recess therein shaped to receive said coin with the edge thereof extending beyond said member, and means for rotating said member in a path where the projecting edge of the coin contacts with the end of the indicator latch and moves the latch to an overtravel position and a rest position corresponding to the diameter of said coin.

16. In a parking meter of the type having a coin slot accessible to the parker and adapted for edgewise insertion of coins of different diameters therein, the improvement comprising an indicator biased for movement in one direction, a movable indicator latch biased toward an indicator engaging position and normally preventing movement of the indicator in said one direction, said latch having a portion contacting an edge of a coin inserted in the meter at a point remote from the coin slot and being movable by the contacted coin to an over-travel and a rest position, and latch-engaging means carried by the indicator and engaging with the latch at different positions thereof.

17. In a parking meter, the improvement as defined in claim 16 wherein the latch-engaging means includes a rack carried by the indicator, said rack having spaced ratchet teeth of different lengths thereon, said teeth of different lengths engaging with the latch at different positions thereof for coins of different diameters.

18. In a parking meter, the improvement as defined in claim 16 wherein the latch-engaging means comprises a rack carried by the indicator, a series of spaced ratchet teeth on said rack, said ratchet teeth engaging with the latch at the rest position of the latch for a coin of one diameter, said last-mentioned teeth being cleared by the latch at the overtravel position thereof for the said diameter coin and at the rest and overtravel positions of the latch for a coin of a larger diameter, a second series of spaced ratchet teeth on said rack, said second teeth engaging with the latch at the rest positions thereof for coins of both diameters and the overtravel position of the ltach for the first-mentioned coin.

19. In a parking meter wherein an indicator is movable to different purchased-time positions after the insertion in the meter of coins of denominations having different diameters, the improvement comprising an indicator, said indicator being biased for movement in one direction and being movable linearly in one direction, a pivoted indicator latch biased toward an indicator engaging position and normally preventing movement of the indicator in said one direction, said latch having a portion contacting the edge of an inserted coin and being movable by the contacted coin to an overtravel and a rest position, said positions being different for coins of different diameters, and latch-engaging means carried by the indicator and engaging with the latch at the different positions thereof upon linear movement of the indicator a distance corresponding to parking time purchasable by a coin of the denomination inserted.

20. In a parking meter wherein an indicator is movable to different purchased-time positions after the insertion in the meter of coins of denominations having different diameters, the improvement comprising a movable indicator, said indicator being biased for movement in one direction, a pivoted indicator latch biased toward an indicator engaging position and normally preventing movement of the indicator in said one direction, said latch having a portion contacting the edge of a coin inserted in the meter and being movable by said coin to an overtravel and a rest position, said positions being different for coins of different diameters, and a rack carried by the indicator, said rack having spaced ratchet teeth of different lengths thereon, said teeth engaging with the latch at different overtravel and rest positions of the latch.

21. In a parking meter having an indicator that is progressively movable to different purchased-time positions after the insertion in the meter of a series of coins of one denomination and is movable to another indicating position after the insertion of coins of denominations having different diameters, the improvement comprising a movable indicator, said indicator being biased for movement in one direction to different purchased-time positions thereof, a movable indicator latch biased toward an indicator engaging position and normally preventing movement of the indicator in said one direction, said latch having a portion contacting the edge of a coin inserted in the meter and being movable out of said indicator engaging position thereby, and a rack carried by the indicator, said rack having a series of spaced ratchet teeth, said teeth engaging with the latch when the latch is moved out of said indicator engaging position and being spaced on the rack at distances corresponding to the parking period purchasable by the coin inserted in the meter.

22. In a parking meter having an indicator that is progressively movable to different purchased-time positions upon insertion in the meter of a series of coins of one diameter and is movable to other indicating positions upon insertion in the meter of coins of denominations having a larger diameter, the improvement comprising a movable indicator, said indicator being biased for movement in one direction to a series of different purchased-time positions thereof, an indicator latch biased toward an indicator engaging position and normally preventing movement of the indicator in said one direction, said latch having a portion contacting the edge of a coin inserted in the meter and being movable by said coin to an overtravel position and a rest position, said positions being different for coins of different diameters, and a rack carried by the indicator, said rack having a series of ratchet teeth thereon engaging with the indicator latch at the rest position of the latch for a coin of one diameter, and a second series of spaced ratchet teeth thereon engaging with the latch at the rest position of the latch for a coin of a larger diameter, said teeth being spaced on the rack at distances corresponding to the parking period purchasable by the respective coins.

23. In a parking meter wherein an indicator is progressively movable to different purchased-time positions after the insertion in the meter of a series of coins of one diameter and is movable to another indicating position upon insertion of coins of a denomination having a larger diameter, the improvement comprising a movable indicator, said indicator being biased for movement in one direction to different purchased-time positions, an indicator latch biased toward an indicator engaging position and normally preventing movement of the indicator in said one direction, said latch having a portion contacting the edge of a coin inserted in the meter and being movable by said coin to an overtravel position and a rest position, said positions being different for coins of different diameters, a rack carried by the indicator, said rack having a series of spaced ratchet teeth engaging with the latch at different positions thereof, said ratchet teeth being of at least three different lengths, the ratchet teeth of different lengths engaging with the latch at the rest positions thereof for the coins of different diameters.

References Cited in the file of this patent

UNITED STATES PATENTS

| | | |
|---|---|---|
| 1,206,557 | Long | Nov. 28, 1916 |
| 1,919,581 | Webb | July 25, 1933 |
| 1,996,338 | Kenyon | Apr. 2, 1935 |
| 2,108,651 | Cherry | Feb. 15, 1938 |
| 2,130,155 | Rockola | Sept. 13, 1938 |
| 2,161,046 | Hitzeman | June 6, 1939 |
| 2,162,191 | Woodruff | June 13, 1939 |
| 2,197,086 | Toce | Apr. 16, 1940 |
| 2,218,821 | Jennings | Oct. 22, 1940 |
| 2,228,396 | Martin | Jan. 14, 1941 |
| 2,259,177 | Rockola | Oct. 14, 1941 |
| 2,284,221 | McGay | May 26, 1942 |
| 2,289,838 | Herschede | July 14, 1942 |
| 2,316,364 | Rhodes | Apr. 13, 1943 |
| 2,329,926 | Michaels | Sept. 21, 1943 |
| 2,430,583 | Rhodes | Nov. 11, 1947 |
| 2,563,182 | Michaels | Aug. 7, 1951 |
| 2,625,250 | Hale | Jan. 13, 1953 |

FOREIGN PATENTS

| | | |
|---|---|---|
| 323,179 | Great Britain | Dec. 16, 1929 |